United States Patent [19]

Spanbauer

[11] 3,717,810
[45] Feb. 20, 1973

[54] ABNORMAL IMPEDANCE TEST FOR A STRING OF GEOPHONES

[75] Inventor: Francis L. Spanbauer, Lower Burrell, Pa.

[73] Assignee: Gulf Research & Development Company, Pittsburgh, Pa.

[22] Filed: July 15, 1971

[21] Appl. No.: 162,788

[52] U.S. Cl. ............... 324/57 R, 324/62 R, 324/73 R
[51] Int. Cl. .............................................. G01c 27/00
[58] Field of Search ..... 324/64, 65 R, 62 R, 57 R, 66, 324/73 R; 340/17

[56] References Cited

UNITED STATES PATENTS

| | | | |
|---|---|---|---|
| 2,649,579 | 8/1953 | Alexander | 340/17 |
| 2,917,706 | 12/1959 | Thompson | 324/73 R |
| 3,182,253 | 5/1965 | Dorsch et al. | 324/66 X |
| 3,303,418 | 2/1967 | Rose | 324/64 |
| 3,333,186 | 7/1967 | Mowery | 324/73 R |
| 3,339,138 | 8/1967 | Baker et al. | 324/64 |
| 3,417,323 | 12/1968 | Williamson | 324/64 X |

Primary Examiner—Stanley T. Krawczewicz
Attorney—Meyer Neishloss et al.

[57] ABSTRACT

A system for dynamically checking a string of geophones as are used in seismic exploration by means of supplying power to the string to thereby operate the geophones in motor mode to thereby check the impedance of the string against a selected acceptable value of impedance.

13 Claims, 1 Drawing Figure

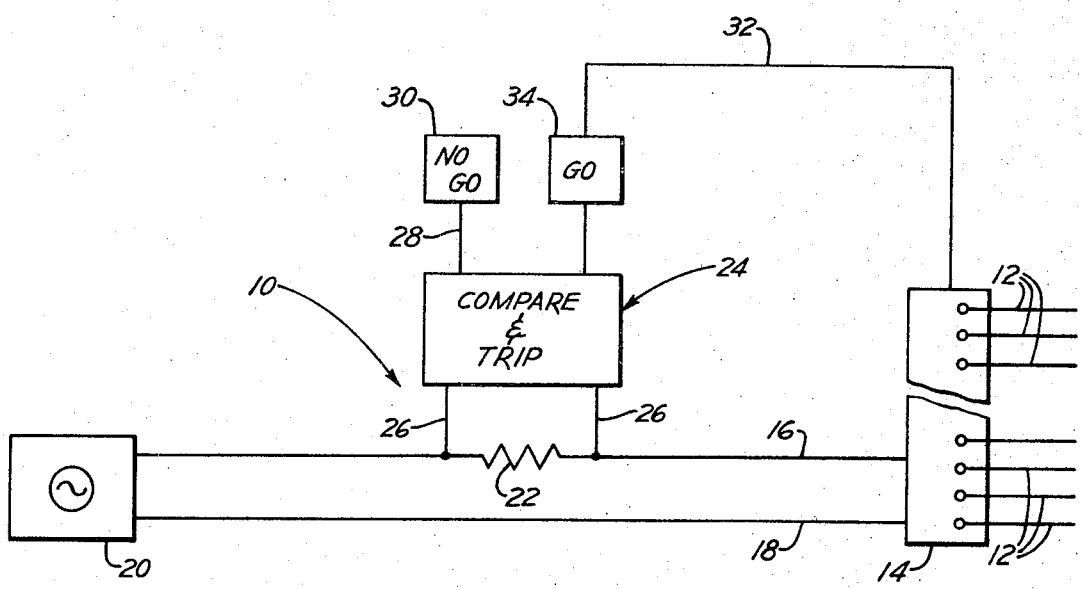
INVENTOR.
FRANCIS L. SPANBAUER

ABNORMAL IMPEDANCE TEST FOR A STRING OF GEOPHONES

This invention pertains to method and apparatus for dynamically testing geophones.

In the art of exploration for underground mineral deposits, the seismic procedure is to produce waves or vibrations, as by the explosion of a dynamite charge, and then to record these waves after they have passed down into the earth and then back up to the surface. The travel times are correlated to distances from the surface to the various underground horizons. A geophone is a device for receiving such waves or vibrations.

As is known, geophones are almost invariably used in long strings so that spurious or random signals received will be cancelled out and the entire line of geophones will produce an average signal which may be recorded as a single trace on the final seismogram. A large number of variations and permutations of the technique are used.

As used herein, the term "geophone" shall be understood to mean any device which transforms mechanical vibrations received by it into electrical energy, and which operates on the principle of a spring mounted weight which moves a coil with respect to a magnetic field to thereby produce electrical energy in response to the vibrations received.

Such a device has been described in the literature as early as 1929. A good reference is the book "Geophysical Exploration" by C. A. Heiland, 1946, page 593 et. seq. At present, such geophones are sold by GeoSpace Company of Houston, Texas, Model No. HS–1, among many others.

The geophones usually comprise interchangeable bases which often include a spike or the like in their physical structure. The spike permits the geophone to be acoustically coupled to the earth, or, in the jargon, to be "planted" in the ground. The more or less standard seismic technique is to place an array of such geophones in the earth, to then fire the explosive charge, record the results, move the array, etc. The array of geophones will include anywhere from 12 to 96 lines, each containing from one to several hundred separate geophones. Typically, 24 lines are used, each line containing 54 geophones.

Heretofore, in testing such arrays after they are planted or emplaced and before firing the shot, only the electrical resistance, i.e., the d-c continuity of each string or line of geophones was checked. This system would find a faulty coil resistance, a short between a coil and a housing, an open or shorted connecting line, or the like. However, this prior system is a check of static conditions only, and would not find faults in the geophone which would appear only when the geophone operates, i.e., under dynamic conditions. It is a primary object of the present invention to dynamically check a line of geophones.

As examples, the following specific conditions would result in poor data, would be found by the method and apparatus of the present invention, and would not be found by the prior resistance check method:

1. A geophone with a faulty spring, such as a spring including fatigued metal or one deformed by rough handling.
2. A geophone with a jammed coil or with foreign matter in the coil/magnet gap sufficient to interfere with the normal relative motion between coil and magnet.
3. A geophone planted out of plumb. Each geophone must be straight in the earth to within a few degrees in order to respond properly.
4. A geophone planted so as to make a poor coupling to the earth.

The basic premise of the manner of operation of the method and apparatus of the invention is that the impedance of a string of geophones, when the string is operated in its motor mode, is an indication of the proper dynamic condition of that string. "Motor Mode" is the reverse of normal geophone operation, i.e., a situation in which electrical energy is supplied to the geophone to cause physical motion of the internal operative parts thereof. Thus, in the motor mode, power is supplied to the geophone to effectually cause the geophone to try to move the earth, rather than, as in normal operation, where the motions of the earth move the parts of the geophone to thereby produce electrical energy.

The common and perhaps only dynamic check now used comprises the operator kicking the ground near a geophone and observing the recorded deflections. This is only qualitative and determines sensitivity to a large amplitude motion, the kick, whereas the seismic motions to be recorded are very small amplitude motions. The "kick" test also only "checks" a single geophone. The present invention checks an entire string for sensitivity to small amplitude motion. The amplitude is proportional to the power supplied to the geophone string in the motor mode test. It is possible and common for a defective geophone to be sensitive to large motions, such as a kick, but insensitive to small motions. In the present invention, a defective geophone in a string of otherwise good geophones will dynamically interact with the good geophones and this interaction can be detected at the line terminus as an abnormal impedance.

The above and other advantages of the invention will be pointed out or will become evident in the following detailed description and claims, and in the accompanying drawing also forming a part of the disclosure, in which the sole FIGURE is a schematic diagram of apparatus embodying the invention.

Referring now in detail to the drawing, 10 designates a circuit embodying the invention to which a plurality of lines of geophones 12 are brought. Geophone lines 12 are connected to a stepping device 14 forming part of circuit 10. A pair of lines 16 and 18 connect stepping device 14 to a power supply 20. A small resistance 22 is included in line 16 for the purpose of providing a convenient location at which to connect the remainder of the circuitry. As is known, resistor 22 is of a small enough value not to effect the response of the geophones on the lines 12.

A comparing and tripping circuit 24 is connected to line 16 across resistor 22 by a pair of lines 26. A line 28 connects "NO GO" indicating means 30 to circuit 24. A line 32 including "GO" indicating means 34 interconnects circuit 24 and device 14.

The two indicating means 30 and 34, and especially 30, may comprise lights, sound producing devices, blinkers, or any combination of such means. As will be evident from the operation section below, the circuitry performs quite simple functions, and it is easily within the expertise of one skilled in the art to make a circuit to accomplish these functions, and therefore no further circuit details are shown.

OPERATION

The operation of the invention depends upon measurement of the a-c impedance or Z value of each string of geophones. Therefore, of course, power supply 20 must generate a cyclical feed signal to drive the geophones. This cyclical feed signal will most commonly be sinusoidal in shape. The sine wave shape is preferred for many reasons; it lends itself to the use of simple and proven circuitry at 20 and 24, it is a shape which exercises or drives the geophones in an easily predictable cycle, and is the waveshape which most closely simulates actual seismic motion. Other waveshapes have not yet been tried.

The invention can be operated by arranging the circuit to supply this cyclical or alternating electrical energy to the geophones when the cyclical character of the electrical energy is either in the current or in the voltage. That is, one of voltage and current will be held constant at some RMS value, while measurements will be made of the other of the RMS value of current and voltage, which other is responsive to the dynamic condition of the geophone string being checked. These two modes of operation are possible because impedance is proportional to vector voltage over vector current. However, it is preferred to operate in that mode in which the RMS value of current responds to the geophone dynamic condition because, in that mode, power supply 20 is a simpler circuit to fabricate than it would be if it were necessary to generate a constant RMS current. However, if the constant RMS current mode of operation were used, compare and trip circuit 24 would be connected across lines 16 and 18, and resistor 22 would be omitted, all as is readily understandable by one skilled in the art.

The term RMS is well known to those skilled in the art and literally means root-mean-square. In the electrical arts, the term is precisely defined, see "Analysis of Electric Circuits," by Brenner and Javid, published by McGraw-Hill, copyright 1959, page 26. The frequency of the cyclical electrical energy used in the invention, regardless of waveshape and regardless of mode of operation, is not changed during use because the impedance of a geophone is a function of frequency. Present day geophones have a known impedance curve, which curve contains a dynamic peak at the natural resonance frequency of the geophone. The frequency of the alternating electrical energy used in the invention is selected so as to be close to but greater than that peak. It is thought that the invention should operate at a frequency of 110 percent of that peak frequency for a particular geophone.

Means not shown are provided in circuitry 24 to adjustably set some value for RMS current corresponding to that impedance which indicates the proper or acceptable dynamic condition of each string of geophones 12 of a particular set of geophone lines under a particular set of conditions. As is known, this acceptable value will depend upon many factors, such as the type of survey, the number of geophones in the line, the condition of the equipment, the skill of the crew, and the like. Balanced against the desire for high accuracy is the fact that increased accuracy is expensive in terms of crew time for making adjustments and repairs if needed.

Once the acceptable RMS current value is determined, device 14 connects the first string 12 to the power supply 20 to cause that string of geophones to operate in motor mode. Circuit 24 senses the response of the first string, and finding that the value measured is within the determined tolerance, circuit 24 provides a signal on line 34 operating "GO" indicating means 34 and operating stepping device 14 to connect lines 16 and 18 to the next line of geophones 12. Operation continues in this manner until all the lines 12 have been checked. In the event a line 12 should be found to have an unacceptable value, then circuit 24 will produce a signal on line 28 to operate "NO GO" indicating means 30. Means not shown will also be included in device 14 or circuit 24, or both, to show the operator which particular line is then being tested so that he will know which line requires attention in the event indicating means 30 operate.

The circuit shown is automatic to test a plurality of strings of geophones. However, as will be readily apparent to one skilled in the art, the automatic feature could be turned off or bypassed if required for any reason, such as to repeatedly check a particularly troublesome line of geophones.

As an optional feature, circuit 24 in the drawing could also include an oscilloscope connected across resistor 22. An oscilloscope at this point may be desirable because certain geophone effects may be visible on the waveform displayed on the CR tube to aid in locating the defect. That is, after accumulating some experience in the use of the invention, an operator should be able to "see" certain things in the displayed waveform that will simplify correction of a fault detected by the invention.

The entire circuit 10 could easily be included in one instrument housing and carried on or mounted in an ordinary seismic field equipment truck. The invention would be used in addition to the conventional static check such as the resistance type mentioned above, and in fact, such a resistance checker could be, and in a commercial unit almost certainly would be, easily incorporated together with circuit 10.

An embodiment of the invention can be built entirely with commercially available components. The three basic elements, oscillator or power supply 20, stepping device 14, and compare and trip circuit 24, are all very well known. By way of example, the oscillator is available from Burr-Brown Research Corporation of Tucson, Arizona, their Model No. 4023/25, and is shown in their 1969 catalog LI-220J at the left hand side of page 20. The compare and trip device may be a Burr-Brown model 4022/25 described on pages 2 and 3 of their catalog PDS-221 dated November 1969. As an incidental matter, FIG. 3 in this catalog shows the 4022/25 comparator driving a relay coil, which may be the relay coil of a stepping switch or rotary solenoid. Suitable stepping devices to function at 14 are available from Ledex Inc. of Dayton, Ohio and are described in their catalog B-165 dated January 1967. In the top left side of page 5 of this catalog the basic simple action required of a stepping switch as used in the invention is shown in detail. Virtually any of the Ledex stepping switches having a suitable number of contacts to which the lines 12 would be connected could be used.

While the invention has been described in detail above, it is to be understood that this detailed description is by way of example only, and the protection granted is to be limited only within the spirit of the invention and the scope of the following claims.

I claim:

1. A method of dynamically checking a string of geophones comprising the steps of supplying alternating electrical energy to said string, holding one of voltage and current of said electrical energy at some constant RMS value, measuring the other of the RMS value of current and voltage, and comparing said measured value to a predetermined acceptable value thereof for said string.

2. The method of claim 1, wherein said voltage is held at said constant RMS value.

3. The method of claim 2, wherein said current is generated sinusoidally.

4. The method of claim 1, wherein the frequency of said alternating electrical energy is selected so as to be close to but greater than the dynamic peak at the natural resonance frequency of the individual geophones in said string of geophones.

5. The method of claim 1, wherein a plurality of said strings of geophones are checked sequentially and automatically, comprising the steps of connecting all of said strings to stepping means, and utilizing the result of said comparison step indicating that said measured value of said one string is acceptable to cause said stepping means to disconnect said one string from said measuring means and to connect the next string to said measuring means.

6. The method of claim 5, and operating first indicating means to indicate that a particular string has an acceptable measured value or operating second indicating means to indicate a particular string has an unacceptable measured value after said step of comparing for each string.

7. Apparatus for dynamically checking a string of geophones comprising power supply means, said power supply means including means to hold one of voltage and current of the electrical energy supplied at some constant RMS value, means for measuring the other of the RMS value of current and voltage, and means for comparing said measured value to a predetermined acceptable value thereof for said string.

8. The combination of claim 7, wherein said power supply means comprises means to hold said voltage at said constant RMS value.

9. The combination of claim 8, wherein said power supply means comprises means to cycle the value of current sinusoidally.

10. The combination of claim 7, and stepping means, means for connecting a plurality of said strings of geophones to said stepping means, and said comparing means including means to cause said stepping means to sequentially connect each of said strings to said power supply means.

11. The combination of claim 10, first indicating means for indicating that a particular string has an acceptable measured value, and second indicating means for indicating that a particular string has an unacceptable measured value.

12. The combination of claim 7, wherein said power supply means causes the frequency of said alternating electrical energy to be close to but greater than the dynamic peak at the natural resonance frequency of the individual geophones in said string of geophones.

13. The combination of claim 7, and an oscilloscope operatively cooperable with said measuring means, whereby the shape of said other of the RMS value of current and voltage may be visually displayed to an operator.

* * * * *